United States Patent
Neelamani et al.

(10) Patent No.: US 9,447,554 B1
(45) Date of Patent: Sep. 20, 2016

(54) METHOD OF DISSIPATING WATER WAVE ENERGY

(71) Applicant: KUWAIT INSTITUTE OF SCIENTIFIC RESEARCH, Safat (KW)

(72) Inventors: Subramaniam Neelamani, Riggae (KW); Altaf Taqi, Egaila (KW); Khaled Al-Salem, Al-Surah (KW)

(73) Assignee: KUWAIT INSTITUTE OF SCIENTIFIC RESEARCH, Safat (KW)

( * ) Notice: Subject to any disclaimer, the term of this patent is extended or adjusted under 35 U.S.C. 154(b) by 0 days.

(21) Appl. No.: 14/940,087

(22) Filed: Nov. 12, 2015

(51) Int. Cl.
*E02B 3/06* (2006.01)

(52) U.S. Cl.
CPC *E02B 3/06* (2013.01); *E02B 3/062* (2013.01)

(58) Field of Classification Search
USPC .......................... 405/21, 30, 31, 33, 34, 35
See application file for complete search history.

(56) References Cited

U.S. PATENT DOCUMENTS

| | | | |
|---|---|---|---|
| 326,931 A * | 9/1885 | Whittenburg | B63G 9/04 256/13 |
| 762,727 A * | 6/1904 | Landenberger, Jr. | E02B 3/04 404/6 |
| 3,118,282 A | 1/1964 | Jarlan | |
| 3,387,458 A | 6/1968 | Jarlan | |
| 3,878,684 A | 4/1975 | Lamy | |
| 4,154,548 A | 5/1979 | Ijima | |
| 4,836,709 A | 6/1989 | Ploeg et al. | |
| 2014/0270962 A1 | 9/2014 | Andrus et al. | |

FOREIGN PATENT DOCUMENTS

| | | |
|---|---|---|
| FR | 2 729 981 | 8/1996 |
| JP | 63251513 A | * 10/1988 |
| JP | 2000-204531 | 7/2000 |

OTHER PUBLICATIONS

Premasiri, "Experimental Study of Wave Interactions with Slotted Barriers," Thesis, Jan. 1997, The University of British Columbia.

* cited by examiner

*Primary Examiner* — Benjamin Fiorello
*Assistant Examiner* — Kyle Armstrong
(74) *Attorney, Agent, or Firm* — Richard C. Litman (57) ABSTRACT

The method of dissipating water wave energy includes using an array of vertically-extending breakwater walls for dissipating the energy of water waves in an area of interest. Each vertically-extending wall has a plurality of horizontally-extending slots formed therethrough. The areas and/or configurations of the horizontally-extending slots can be varied such that each vertically-extending wall can have a unique degree of porosity. Each vertically extending wall can be positioned in succession in front of a water-impregnable rear barrier. The slots of one vertically-extending wall can be staggered or nonaligned relative to the next vertically-extending wall in succession.

1 Claim, 4 Drawing Sheets

METHOD OF DISSIPATING WATER WAVE ENERGY

BACKGROUND OF THE INVENTION

1. Field of the Invention

The present invention relates to breakwater systems, and particularly to a method of dissipating water wave energy that provides a highly configurable, compact breakwater barrier with minimal material costs and increased dissipation performance.

2. Description of the Related Art

A breakwater structure or system is a natural or manmade barrier designed to reduce or dissipate the kinetic energy of waves impacting the shoreline from a relatively large body of water, such as lakes or oceans. Breakwaters help to reduce erosion of the coastline and/or provide safe harbor. Most conventional breakwater barriers are constructed as sloped mounds of rubble that follow or extend along a predetermined length of the shoreline, either onshore or offshore. Construction of such structures requires large quantities of rubble as well as substantial financial expenditures for the raw materials and labor. The raw material requirements may be an issue for some areas and countries with limited material availability. Moreover, breakwaters occupy a relatively large useable area. Additionally, while conventional breakwaters provide suitable dissipation for most types of waves, they tend to be less efficient for long waves.

When constructing certain seaside structures, such as a harbor or port, effective utilization of harbor water plan space is a significant consideration for long-term financial justification. Such a project must account for, and balance, the available space between businesses, residences, harborage, and the actual area for breakwater installation to justify and ensure returns on such a financial investment. For example, for a mean water depth of 7 m, the base width of a conventional rubble mound breakwater with an impermeable back wall can range from between 12 m and 16 m. Unfortunately, based on such a breakwater, an effective width of 10 m to 12 m at the inner side of the harbor cannot be utilized for berthing water vessels. It would be desirable to be able to provide a more compact space-saving solution that can be constructed from more readily available materials and remain cost-effective, while providing the same, or better, effectiveness as a conventional sloped breakwater.

Thus, a method of dissipating water wave energy solving the aforementioned problems is desired.

SUMMARY OF THE INVENTION

The method of dissipating water wave energy includes using an array of vertically-extending breakwater walls for dissipating the energy of water waves in the area of interest. Each vertically-extending wall has a plurality of horizontally-extending slots formed therethrough. The areas and/or configurations of the horizontally-extending slots can be varied such that each vertically-extending wall can have a unique degree of porosity. Each vertically extending wall can be positioned in succession in front of a water-impregnable rear barrier. The slots of one vertically-extending wall can be staggered or nonaligned relative to the next vertically-extending wall in succession.

An optimal sub-set of the plurality of vertically-extending walls can be selected by determining the number of requisite walls and the optimum porosity in an array for achieving ideal wave reflection characteristics and/or space savings. Ideal wave reflection characteristics can be better than those achievable by conventional sloped breakwaters.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
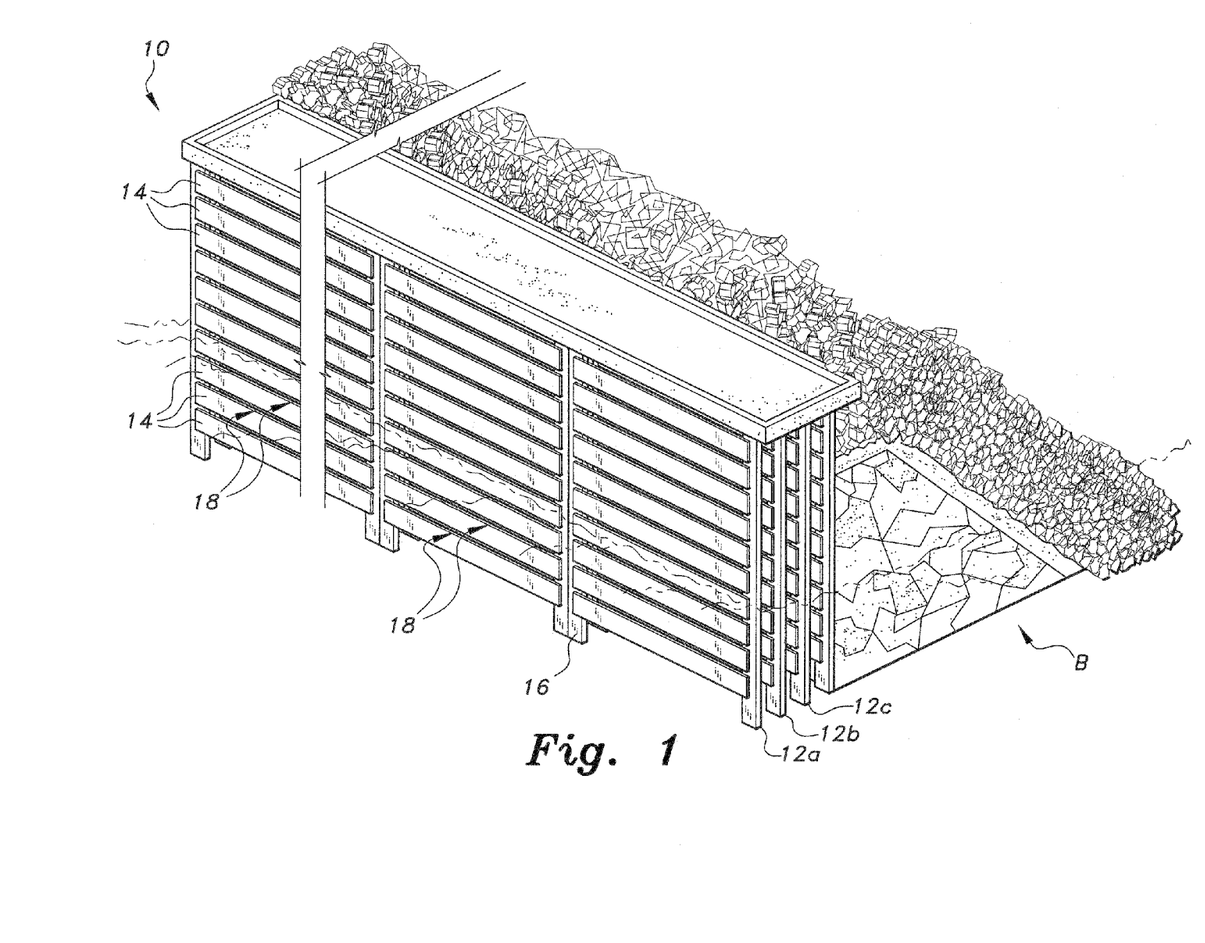
FIG. 1 is an environmental, perspective view of a vertically-extending array for dissipating the energy of water waves used in the method of dissipating water wave energy according to the present invention.

As shown in FIG. 1, the method of dissipating water wave energy includes use of an array of slotted vertical walls 10 to dissipate the energy of water waves W in an area of interest. The array 10 can include one or more vertical slotted breakwater walls 12a, 12b, 12c. As will be described in detail below, the number and type of walls can be selected based on the particular water wave parameters in the region of interest as well as space saving and cost saving considerations. Thus, it should be understood that array 10, formed from the three vertically-extending walls 12a, 12b, 12c, is shown for exemplary purposes only.

In use, a plurality of the vertically-extending walls are provided to the user, where each vertically-extending wall has a plurality of horizontally-extending slots formed therethrough. The areas and/or configurations of the horizontally-extending slots can be varied such that each vertically-extending wall has a unique degree of porosity. In the example of FIG. 1, vertically-extending wall 12a is shown as a plurality of slats 14 mounted within a box-like frame 16, with horizontally-extending slots 18 formed between slats 14. It should be understood that this configuration is shown for exemplary purposes only, and that each vertically-extending wall may have any desired relative dimensions or overall contour and, importantly, the degree of porosity of each wall may be varied in any way; i.e., the plurality of vertically-extending walls provided to the user have varying degrees of porosity, and this may be achieved by, for example, varying the number of slats 14 and their respective spacings, or through any other suitable method of manufacture, such as the addition of holes or apertures, for example. It should be understood that the porosity can be defined by the slots 18 between the slats 14. The degree of porosity for each wall can range from about 10% to about 50%.

Figure 2:
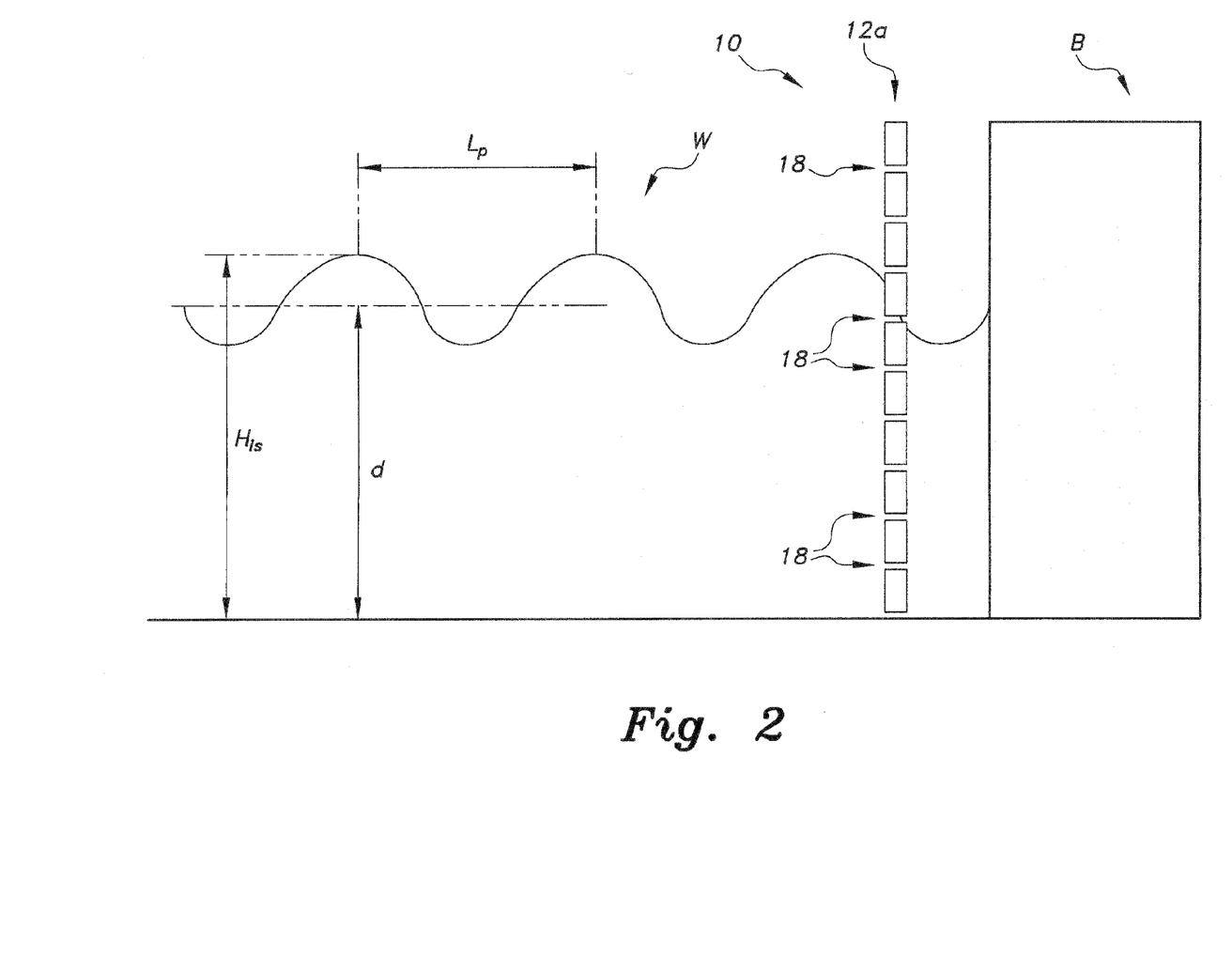
FIG. 2 diagrammatically illustrates an exemplary vertically-extending array used in the method of dissipating water wave energy according to the present invention.

In order to form the vertically-extending array 10 for dissipating water wave energy in the desired region, the user selects a sub-set of the plurality of vertically-extending walls. In FIG. 2, the vertically-extending array 10 is shown formed from the single vertically-extending wall 12a which is positioned ahead of a rear barrier B, which may be a concrete wall, a sloping mound of rubble and/or a combination of both. As shown, the vertically-extending wall 12a can extend normal to a horizontal support surface or floor (e.g., seabed) on which it is positioned. The gradient or the slope of the mound may be varied depending on the desired buttressing against the force of the incoming waves W and the wash character over the breakwater array 10. The rear barrier B may be any water-impregnable barrier, including natural structures.

Figure 3:
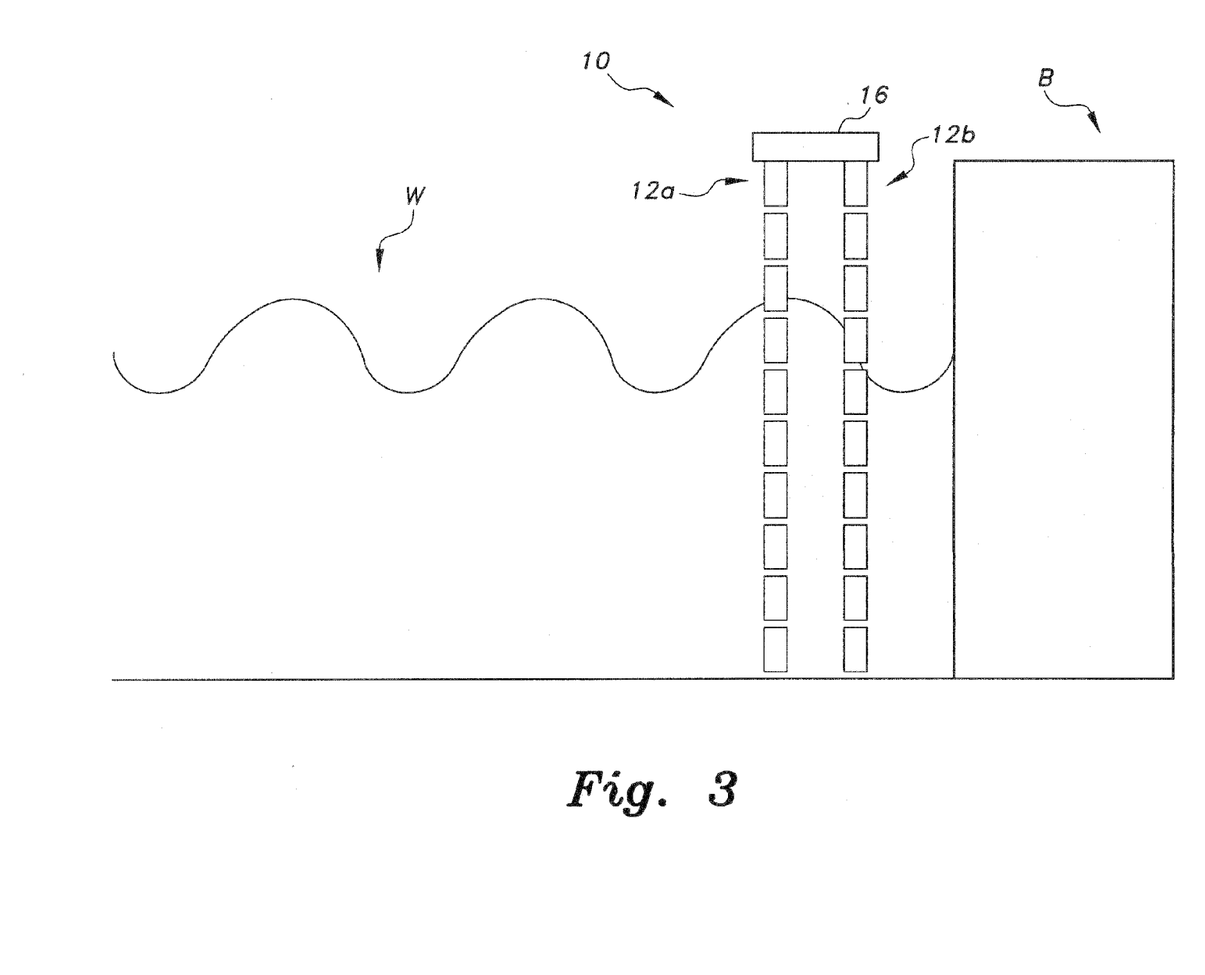
FIG. 3 diagrammatically illustrates a further exemplary vertically-extending array used in the method of dissipating water wave energy according to the present invention.
Figure 4:
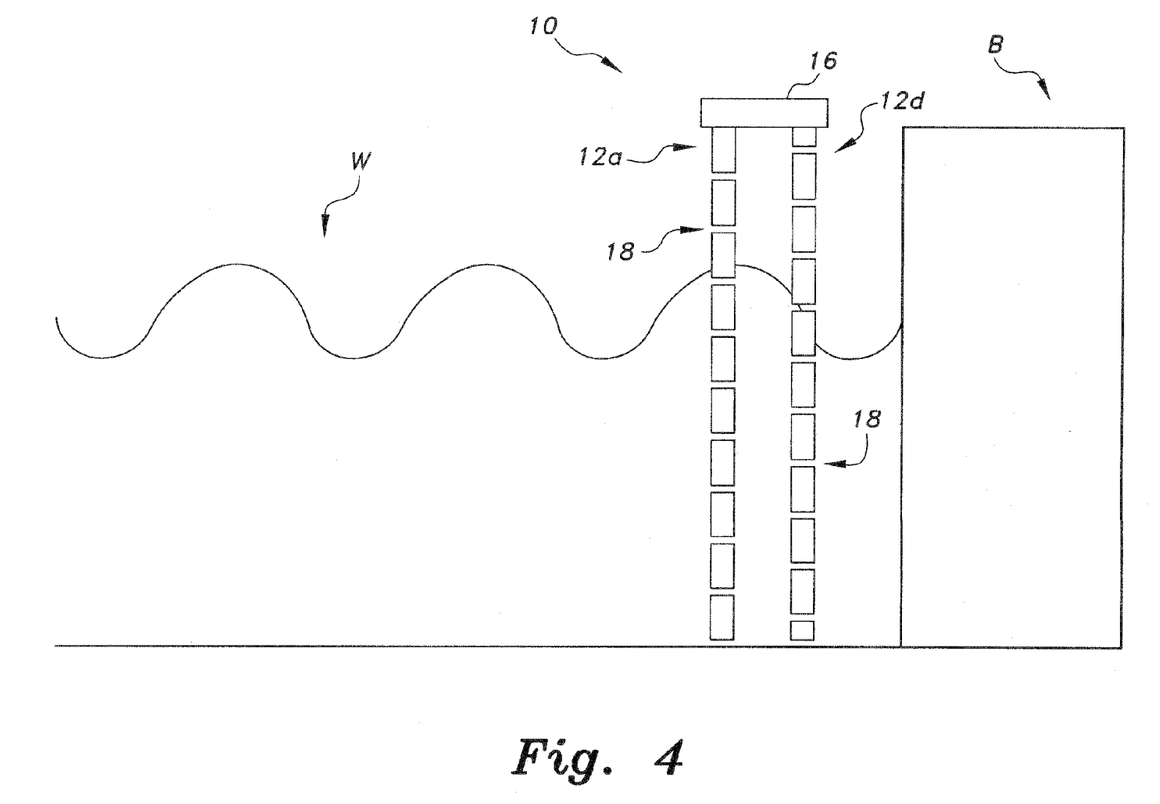
FIG. 4 diagrammatically illustrates another exemplary vertically-extending array used in the method of dissipating water wave energy according to the present invention.

The slats 14 of each vertically-extending wall retard the energy of the incoming waves W, and the slots 18 between the slats 14 permit the waves W to pass through the frame 16 with reduced wave energy. Compared to a conventional, sloped rubble breakwater such a vertically-extending wall provides a more gradual dissipation of wave energy. In the example of FIG. 3, two vertically-extending walls 12a, 12b form the vertically-extending array 10. Each of the walls 12a, 12b may have unique porosities associated therewith. In the further example of FIG. 4, another two vertically-extending walls 12a, 12d form the vertically-extending array 10, where vertically-extending wall 12d is shown having a different slat arrangement than that of vertically-extending wall 12a, illustrative of a desired variation in porosity therebetween. As shown in FIG. 4, the slots 18 of wall 12a can be nonaligned or staggered with respect to the slots 18 of wall 12d, e.g., in a zig-zag configuration.

The optimal number of vertically-extending walls forming the sub-set 10 and the degrees of porosity associated therewith can be selected based on a minimum $K_r$ value (wave reflection coefficient) and/or a minimum number of walls for obtaining wave reflection characteristics equivalent to or better than sloped break waters. As is known in the art, the $K_r$ value is a function of many parameters including the number of vertical slotted barriers, the porosity, the significant wave height, the wavelength corresponding to the peak wave period and the water depth. The relative water depth is calculated as $d/L_p$, where d is a depth of water in the desired region and $L_p$ is an incident wavelength of the water wave W in the desired region, and the relative significant wave height is calculated as $$\frac{H_{is}}{d},$$

where $H_{is}$ is the significant incident wave height of the water wave W. The significant wave height is defined as the average top one-third wave height in the random wave time series acting on the vertical slotted barrier.

Once the number of vertically-extending walls and the specific vertically-extending walls with desired porosity have been selected, the vertically-extending array 10 is then positioned in the desired region for dissipation of water wave energy therein (i.e., providing a breakwater in the desired region).

Table 1 below summarizes the slopes of a number of conventional sloped breakwaters, showing their conventional horizontal (H) and vertical (V) dimensions and their gradients, compared against the 90° "slope" of the vertically-extending walls of the present invention.

TABLE 1

| Physical Model Wall Type and Configuration | |
| --- | --- |
| Wall Configuration Type | Slope |
| Vertical wall (without any porosity) and vertical perforated wall (1, 2, 3, 4, 5, and 6 walls with 10%, 20%, 30%, 40%, and 50% porosity) | 90° |
| Rubble mound, 900 mm V and 1200 mm H | 36.87° |

TABLE 1-continued

| Physical Model Wall Type and Configuration | |
| --- | --- |
| Wall Configuration Type | Slope |
| Armor mound Seabee, 900 mm V and 1200 mm H | 36.87° |
| Armor mound Dolos, 900 mm V and 1200 mm H | 36.87° |
| Rubble mound, 700 mm V and 1200 mm H | 30.26° |
| Armor mound Dolos, 700 mm V and 1200 mm H | 30.26° |
| Armor mound Seabee, 700 mm V and 1200 mm H | 30.26° |

In order to determine appropriate combinations of vertically-extending walls, experiments were carried out using both conventional sloped breakwaters (summarized in Table 1) and arrays of vertically-extending walls having between one and six walls with varying porosities. The different configurations are summarized below in Table 2.

TABLE 2

| Vertically-Extending Barrier (Slotted Wall) Configurations and Details | |
| --- | --- |
| Configuration No. | Model Description |
| 1 | Vertical wall |
| 2 | Rubble mound, 30.256° slope (0.7 V: 1.2 H) |
| 3 | Armor mound with Seabee, 30.256° slope (0.7 V: 1.2 H) |
| 4 | Armor mound with Dolos, 30.256° slope (0.7 V: 1.2 H) |
| 5 | Rubble mound, 36.87° slope (0.9 V: 1.2 H) |
| 6 | Armor mound with Seabee, 36.87° slope (0.9 V: 1.2 H) |
| 7 | Armor mound with Dolos, 36.87° slope (0.9 V: 1.2 H) |
| 8 | Slotted wall: 1 wall with 10% porosity |
| 9 | Slotted wall: 2 walls with 10% porosity |
| 10 | Slotted wall: 3 walls with 10% porosity |
| 11 | Slotted wall: 4 walls with 10% porosity |
| 12 | Slotted wall: 5 walls with 10% porosity |
| 13 | Slotted wall: 6 walls with 10% porosity |
| 14 | Slotted wall: 1 wall with 20% porosity |
| 15 | Slotted wall: 2 walls with 20% porosity |
| 16 | Slotted wall: 3 walls with 20% porosity |
| 17 | Slotted wall: 4 walls with 20% porosity |
| 18 | Slotted wall: 5 walls with 20% porosity |
| 19 | Slotted wall: 6 walls with 20% porosity |
| 20 | Slotted wall: 1 wall with 30% porosity |
| 21 | Slotted wall: 2 walls with 30% porosity |
| 22 | Slotted wall: 3 walls with 30% porosity |
| 23 | Slotted wall: 4 walls with 30% porosity |
| 24 | Slotted wall: 5 walls with 30% porosity |
| 25 | Slotted wall: 6 walls with 30% porosity |
| 26 | Slotted wall: 1 wall with 40% porosity |
| 27 | Slotted wall: 2 walls with 40% porosity |
| 28 | Slotted wall: 3 walls with 40% porosity |
| 29 | Slotted wall: 4 walls with 40% porosity |
| 30 | Slotted wall: 5 walls with 40% porosity |
| 31 | Slotted wall: 6 walls with 40% porosity |
| 32 | Slotted wall: 1 wall with 50% porosity |
| 33 | Slotted wall: 2 walls with 50% porosity |
| 34 | Slotted wall: 3 walls with 50% porosity |
| 35 | Slotted wall: 4 walls with 50% porosity |
| 36 | Slotted wall: 5 walls with 50% porosity |
| 37 | Slotted wall: 6 walls with 50% porosity |

Table 3 below shows differing random wave parameters used in the experiments with the differing configurations of vertically-extending walls forming the array, and Table 4 below shows the normalized input parameters for random waves.

TABLE 3

Random Wave Parameters

| Peak wave period, $T_p$ (s) | Significant wave height, $H_{is}$ (mm) |
|---|---|
| 1.0 | 50,100,150 |
| 1.5 | 50,100,150 |
| 2.0 | 50,100,150 |
| 2.5 | 50,100,150 |
| 3.0 | 50,100,150 |

TABLE 4

Normalized Input Parameters for Random Waves

| S. No. | $H_{is}$ (m) | $T_p$ (s) | $L_p$ (m) | $H_{is}/d$ | $H_{is}/L_p$ | Ursell Parameter | $d/L_p$ | $k_p d$ |
|---|---|---|---|---|---|---|---|---|
| 1 | 0.05 | 1.0 | 1.549 | 0.071 | 0.032 | 0.35 | 0.452 | 2.841 |
| 2 | 0.10 | 1.0 | 1.549 | 0.143 | 0.065 | 0.70 | 0.452 | 2.841 |
| 3 | 0.15 | 1.0 | 1.549 | 0.214 | 0.097 | 1.05 | 0.452 | 2.841 |
| 4 | 0.05 | 1.5 | 3.115 | 0.071 | 0.016 | 1.41 | 0.225 | 1.412 |
| 5 | 0.10 | 1.5 | 3.115 | 0.143 | 0.032 | 2.83 | 0.225 | 1.412 |
| 6 | 0.15 | 1.5 | 3.115 | 0.214 | 0.048 | 4.24 | 0.225 | 1.412 |
| 7 | 0.05 | 2.0 | 4.624 | 0.071 | 0.011 | 3.12 | 0.151 | 0.952 |
| 8 | 0.10 | 2.0 | 4.624 | 0.143 | 0.022 | 6.23 | 0.151 | 0.952 |
| 9 | 0.15 | 2.0 | 4.624 | 0.214 | 0.032 | 9.35 | 0.151 | 0.952 |
| 10 | 0.05 | 2.5 | 6.055 | 0.071 | 0.008 | 5.35 | 0.116 | 0.727 |
| 11 | 0.10 | 2.5 | 6.055 | 0.143 | 0.017 | 10.69 | 0.116 | 0.727 |
| 12 | 0.15 | 2.5 | 6.055 | 0.214 | 0.025 | 16.04 | 0.116 | 0.727 |
| 13 | 0.05 | 3.0 | 7.506 | 0.071 | 0.007 | 8.21 | 0.093 | 0.586 |
| 14 | 0.10 | 3.0 | 7.506 | 0.143 | 0.013 | 16.43 | 0.093 | 0.586 |
| 15 | 0.15 | 3.0 | 7.506 | 0.214 | 0.020 | 24.64 | 0.093 | 0.586 |
| Min | 0.05 | 1.0 | 1.549 | 0.071 | 0.007 | 0.350 | 0.093 | 0.586 |
| Max | 0.15 | 3.0 | 7.506 | 0.214 | 0.097 | 24.638 | 0.452 | 2.841 |

In the above, $H_{is}$ is the significant incident wave height, $T_p$ is the peak wave period, d is the water depth, and $L_p$ is the incident wavelength of wave W, which is estimated using the dispersion equation $$L_p = 1.56 T_p^2 \tanh\left(\frac{2\pi d}{L_p}\right).$$

The normalized input parameters used were relative significant wave height given by $$\frac{H_{is}}{d},$$

incident wave steepness give by $$\frac{H_{is}}{L_p},$$

the Ursell parameter calculated as $$U_r = H_{is}\frac{L_p^2}{d^3},$$

and a relative water depth of $$\frac{d}{L_p}.$$

One can also express the relative water depth in terms of the wave number, $$k_p = \frac{2\pi}{L_p},$$

such that the relative water depth is also given by $k_p d$. If the distance between adjacent vertically-extending walls is given as D, then for a value of D=0.2 m and a water depth of d=0.7 m, the value of relative water depth $$\frac{d}{L_p}$$

can be expressed as $$\frac{3.5D}{L_p}.$$

As shown in Table 4, the relative significant wave height, $$\frac{H_{is}}{d},$$

ranged between 0.071 and 0.214. The range of incident wave steepness, $$\frac{H_{is}}{L_p},$$

was between 0.007 and 0.097, which covers the practical wave steepness range observed in the field. The $$\frac{d}{L_p}$$

ranged between 0.093 and 0.452, indicating that the experiments covered a large range of intermediate water-depth conditions. The Ursell parameter ranged between 0.35 and 24.638, indicating the wave interaction covered the linear to non-linear range.

The selection of an optimal sub-set used to form the array 10 can be based on empirical data for maximizing dispersion of the wave energy while minimizing the number of vertically-extending walls used to form the array, identifying a sub-set of vertically-extending walls with a wave reflection coefficient $K_r$ which is smaller than that of a corresponding conventional sloped, rubble-based breakwater, and/or identifying a minimum value of $K_r$ for a given field wave condition.

In order to minimize the volume of materials used in assembling the array, the volumes for both slotted barriers and conventional sloped, rubble-based breakwaters were tabulated. It was determined that a 0.7 m (V) and 1.2 m (H) sloped breakwater had a volume of 0.42 m³ per meter run, and a 0.9 m (V) and 1.2 m (H) sloped breakwater had a volume of 0.54 m³ per meter run. The height of the vertically-extending walls of array 10 was selected to be 1.5 times the water depth. The percentage volume of materials (e.g., concrete) required for differing numbers of vertically-extending walls with differing porosities compared to the volume required for the 0.9 m (V) and 1.2 m (H) sloped breakwater is shown below in Table 5.

TABLE 5

Percentage Volume of Material Required for Different Number of Vertically-Extending Walls and Porosity Combinations Compared to Volume Required for 0.9 m (V): 1.2 m (H) Conventional Sloped Breakwater Sloped Breakwater

| No. of Walls | 10% Porosity | 20% Porosity | 30% Porosity | 40% Porosity | 50% Porosity |
| --- | --- | --- | --- | --- | --- |
| 1 | 3.50% | 3.11% | 2.72% | 2.33% | 1.95% |
| 2 | 7.00% | 6.22% | 5.45% | 4.67% | 3.89% |
| 3 | 10.50% | 9.34% | 8.17% | 7.00% | 5.84% |
| 4 | 14.00% | 12.45% | 10.89% | 9.34% | 7.78% |
| 5 | 17.51% | 15.56% | 13.62% | 11.67% | 9.73% |
| 6 | 21.00% | 18.66% | 16.33% | 14.00% | 11.67% |

Table 6 below is an exemplary empirical data table for selection of the desired sub-set of vertically-extending walls to form array 10. Thirty different wall combinations are shown, and the volumes thereof range between 1.95% and 21% compared against a conventional breakwater. In order to minimize volume of materials, Table 6 includes differing combinations of $$\frac{d}{L_p} \text{ and } \frac{H_{is}}{d}$$

(Columns 1 and 2); the best among the six sloped breakwaters (based on minimum $K_r$ values among configurations 2 to 7, Column 3); the configurations of vertically-extending walls which are better than the best sloped breakwaters (all vertically-extending walls whose $K_r$ value is either equal to or less than the best sloped breakwater's $K_r$ value, Column 4); the best vertically-extending wall(s) based on minimum $K_r$ value (Column 5); plan space saving based on the selection of vertically-extending wall(s) by minimum $K_r$ value (Column 6); best vertically-extending wall(s) based on the minimum number of vertically-extending walls needed for the construction (Column 7); and the corresponding plan space saving (Column 8). The plan space savings that were achieved when compared against the conventional breakwater are also provided.

From Table 6, it can be seen that when considering the reflection coefficient alone, a sloped breakwater appears more ideal than vertically extending walls for $$\frac{d}{L_p} > 0.225$$

and for all $$\frac{H_{is}}{d},$$

from, since the value of $K_r$ for the vertically-extending walls is not smaller than for the sloped breakwaters. The vertically-extending walls with performances closer to those of the sloped barriers are listed. These can be used to provide more plan spacing, particularly in an inner harbor region. For other $$\frac{d}{L_p}$$

values $$\left(\frac{d}{L_p} = 0.151, 0.116 \text{ and } 0.093\right),$$

there are many choices of vertically-extending arrays available for use which are better than the corresponding sloped breakwaters.

As an example, a marina site with a $$\frac{d}{L_p}$$

of 0.225 and a $$\frac{H_{is}}{d}$$

of 0.214 has a best sloped breakwater corresponding to configuration 7 (out of configurations 2 through 7), with a $K_r$ value of 0.26. Three different vertically-extending arrays are closer to this sloped breakwater; i.e., configuration 22, with three walls with 30% porosity and a $K_r$ of 0.36; configuration 28, with three walls with 40% porosity and a $K_r$ of 0.32; and configuration 34, with three walls with 50% porosity and a $K_r$ of 0.29. Using the criteria of a minimal $K_r$ value, configuration 34 is better and the plan space saving is 50%. Based on the minimum number of vertical barriers, all three configurations require three walls, but configuration 34 has 50% porosity, thus providing minimum volume of material for construction.

As a further example, a marina site with a $$\frac{d}{L_p}$$

of 0.093 and a $$\frac{H_{is}}{d}$$

of 0.214 has a best sloped breakwater corresponding to configuration 7 (out of configurations 2 through 7), with a $K_r$ value of 0.58. Eighteen different vertically-extending arrays are better than this sloped breakwater, as shown in the last row of Table 6. Using the criteria of a minimal $K_r$ value, configuration 37 (six walls with 50% porosity and a $K_r$ of 0.33) is better and the plan space saving is 0%. However, the volume of material required for the construction of configuration 37 is only 11.67% when compared against breakwater configuration 7. Based on the minimum number of walls, configuration 28 (three walls with 40% porosity) is sufficient, and the plan space saving is 50%. It can be seen that by selecting configuration 37, the $K_r$ value is reduced from 0.58 to 0.33 without any space saving benefit. However, by selecting configuration 28, the $K_r$ value is reduced from 0.58 to 0.55 but with significant space saving. Each row of the table can be analyzed with a similar view to select an optimal array for the prevailing wave conditions.

TABLE 6

Empirical Data to Assist in Determining Applicable Array Configuration Based on Wave Reflection Performance

| Column 1 $d/L_p$ | Column 2 $H_{is}/d$ | Column 3 Best among the six sloped breakwater ($K_r$) | Column 4 Perforated barrier configurations that are better than the best sloped breakwater ($K_r$) | Column 5 Best perforated barrier based on minimum $K_r$ value | Column 6 Space saving (%) based on column 5 | Column 7 Best perforated barrier based on minimum number of barriers | Column 8 Space saving (%) based on column 7 |
|---|---|---|---|---|---|---|---|
| 0.452 | 0.071 | 7(0.15) | Not available. The closest are 21(0.29), 25(0.29), 31(0.29) | 21 | 66.7 | 21 | 66.7 |
| 0.452 | 0.143 | 7(0.17) | Not available. The closest are 21(0.31), 25(0.33), 27(0.33), 31(0.32) | 21 | 66.7 | 27 | 66.7 |
| 0.452 | 0.214 | 7(0.19) | Not available. The closest are 21(0.33), 27(0.33), 33(0.32), 37(0.32) | 33 | 66.7 | 33 | 66.7 |
| 0.225 | 0.071 | 7(0.22) | Not available. The closest are 16(0.28), 23(0.30), 29(0.33), 35(0.30) | 16 | 50.0 | 10 | 50.0 |
| 0.225 | 0.143 | 7(0.22) | Not available. The closest are 22(0.29), 29(0.29), 35(0.27) | 35 | 33.3 | 22 | 50.0 |
| 0.225 | 0.214 | 7(0.26) | Not available. The closest are 22(0.36), 28(0.32), 34(0.29) | 34 | 50.0 | 34 | 50.0 |
| 0.151 | 0.071 | 7(0.39) | 10(0.39), 16(0.33), 17(0.30), 18(0.29), 19(0.33), 22(0.37), 23(0.29), 24(0.27), 25(0.28), 29(0.33), 30(0.25), 31(0.27), 35(0.33), 36(0.28), 37(0.28) | 30 | 16.7 | 22 | 50.0 |
| 0.151 | 0.143 | 7(0.37) | 16(0.37), 17(0.36), 22(0.33), 23(0.30), 24(0.28), 25(0.33), 28(0.37), 29(0.27), 30(0.28), 31(0.31), 35(0.28), 36(0.27), 37(0.27) | 29 | 33.3 | 28 | 50.0 |
| 0.151 | 0.214 | 7(0.38) | 22(0.35), 24(0.35), 28(0.37), | 36 | 16.7 | 28 | 50.0 |

TABLE 6-continued

Empirical Data to Assist in Determining Applicable Array Configuration Based on Wave Reflection Performance

| Column 1 $d/L_p$ | Column 2 $H_{is}/d$ | Column 3 Best among the six sloped breakwater ($K_r$) | Column 4 Perforated barrier configurations that are better than the best sloped breakwater ($K_r$) | Column 5 Best perforated barrier based on minimum $K_r$ value | Column 6 Space saving (%) based on column 5 | Column 7 Best perforated barrier based on minimum number of barriers | Column 8 Space saving (%) based on column 7 |
|---|---|---|---|---|---|---|---|
| 0.116 | 0.071 | 7(0.51) | 29(0.31), 30(0.34), 31(0.38), 35(0.31), 36(0.30), 37(0.32) 10(0.41), 11(0.41), 12(0.42), 13(0.46), 16(0.44), 17(0.32), 18(0.28), 19(0.31), 22(0.50), 23(0.36), 24(0.27), 25(0.26), 29(0.41), 30(0.30), 31(0.24), 35(0.45), 36(0.34), 37(0.26) | 31 | 0.0 | 22 | 50.0 |
| 0.116 | 0.143 | 7(0.49) | 10(0.48), 16(0.43), 17(0.37), 18(0.32), 19(0.39), 22(0.44), 23(0.34), 24(0.28), 25(0.37), 28(0.43), 29(0.33), 30(0.30), 31(0.30), 35(0.38), 36(0.30), 37(0.26) | 37 | 0.0 | 28 | 50.0 |
| 0.116 | 0.214 | 7(0.49) | 16(0.45), 17(0.42), 18(0.43), 19(0.45), 22(0.44), 23(0.37), 24(0.33), 25(0.43), 28(0.47), 29(0.34), 30(0.34), 31(0.37), 35(0.38), 36(0.32), 37(0.31) | 37 | 0.0 | 28 | 50.0 |
| 0.093 | 0.071 | 7(0.62) | 10(0.47), 11(0.43), 12(0.41), 13(0.47), 16(0.57), 17(0.39), 18(0.31), 19(0.31), 22(0.61), 23(0.46), 24(0.33), 25(0.27), 29(0.51), 30(0.39), 31(0.28), 35(0.56), 36(0.43), 37(0.31) | 25 | 0.0 | 22 | 50.0 |

TABLE 6-continued

Empirical Data to Assist in Determining Applicable Array
Configuration Based on Wave Reflection Performance

| Column 1 $d/L_p$ | Column 2 $H_{is}/d$ | Column 3 Best among the six sloped breakwater $(K_r)$ | Column 4 Perforated barrier configurations that are better than the best sloped breakwater $(K_r)$ | Column 5 Best perforated barrier based on minimum $K_r$ value | Column 6 Space saving (%) based on column 5 | Column 7 Best perforated barrier based on minimum number of barriers | Column 8 Space saving (%) based on column 7 |
|---|---|---|---|---|---|---|---|
| 0.093 | 0.143 | 7(0.59) | 10(0.51), 11(0.53), 12(0.51), 13(0.57), 16(0.50), 17(0.41), 18(0.38), 19(0.40), 22(0.54), 23(0.48), 24(0.32), 25(0.32), 28(0.59), 29(0.42), 30(0.36), 31(0.32), 35(0.47), 36(0.37), 37(0.30) | 37 | 0.0 | 28 | 50.0 |
| 0.093 | 0.214 | 7(0.58) | 10(0.55), 11(0.58), 12(0.56), 16(0.50), 17(0.45), 18(0.44), 19(0.46), 22(0.52), 23(0.46), 24(0.36), 25(0.43), 28(0.55), 29(0.41), 30(0.39), 31(0.37), 35(0.46), 36(0.38), 37(0.33) | 37 | 0.0 | 28 | 50.0 |

It is to be understood that the present invention is not limited to the embodiments described above, but encompasses any and all embodiments within the scope of the following claims.

We claim:

1. A method of constructing a breakwater system in a desired region, the breakwater system dissipates water wave energy having a specific wave reflection coefficient, Kr, for a predetermined relative water depth and a predetermined relative significant wave height of the water wave, wherein the relative water depth is calculated as $$\frac{d}{L_p},$$

where d is a depth of water in the desired region and $L_p$ is an incident wavelength of the water wave in the desired region, and the relative significant wave height is calculated as $$\frac{H_{is}}{d},$$

where $H_{is}$ is the significant incident wave height of the water wave, comprising the steps of:

providing a plurality of vertically-extending walls, each of the vertically-extending walls having an upper surface, a lower surface, a first end and a second end, each of the vertically-extending walls having a plurality of horizontally-extending continuous slots formed therethrough, wherein each of the vertically-extending walls are formed from a plurality of spaced slats extending from the upper surface to the lower surface and from the first end to the second end, the horizontally-extending slots defined by spaces between the slats such that each slot and each of the vertically-extending walls has the same degree of porosity defined by the horizontally extending slots from about 10% to about 50%;

positioning the vertically-extending walls in succession in the desired region, wherein the positioning of the horizontally-extending slots is selected from the group consisting of the slots being aligned and the slots being nonaligned relative to the horizontally-extending slots of the next vertically-extending wall in succession;

generating a table of wave reflection coefficients, Kr, for a plurality of the plurality of vertically-extending walls, wherein the plurality of the plurality of vertically-extending walls defines a subset; and selecting a subset for dissipating water wave energy in the desired region, wherein the subset and the degrees of porosity associated therewith are selected by determining maximal wave dissipation or minimum wave reflection for the relative water depth and the relative significant wave height of the water wave in the desired region, where the relative water depth is calculated as $$\frac{d}{L_p},$$

where d is a depth of water in a desired region and $L_p$ is an incident wavelength of the water wave in the desired region, and the relative significant wave height is calculated as $$\frac{H_{is}}{d},$$

where $H_{is}$ is a significant incident wave height of the water wave, wherein the step of selecting the subset is further based:
  i) on minimizing the number of the plurality of the plurality of vertically-extending walls from a minimum of two, and
  ii on minimizing the wave reflection coefficient Kr of the plurality of the plurality of vertically-extending walls from a minimum of 0.24.

* * * * *